United States Patent
Cho et al.

(10) Patent No.: US 12,337,497 B2
(45) Date of Patent: *Jun. 24, 2025

(54) APPARATUS FOR MANUFACTURING ELECTRODE PLATE

(71) Applicant: SK On Co., Ltd., Seoul (KR)

(72) Inventors: Bong Kun Cho, Daejeon (KR); Nam Il An, Daejeon (KR); Woo Yeon Cho, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,062

(22) Filed: Feb. 5, 2024

(65) Prior Publication Data
US 2024/0208099 A1    Jun. 27, 2024

Related U.S. Application Data

(63) Continuation of application No. 18/300,879, filed on Apr. 14, 2023, now Pat. No. 11,926,069.

(30) Foreign Application Priority Data

Apr. 15, 2022    (KR) .......................... 10-2022-0046752

(51) Int. Cl.
*B26D 5/00* (2006.01)
*B26F 1/40* (2006.01)
(Continued)

(52) U.S. Cl.
CPC ............... *B26D 5/007* (2013.01); *B26F 1/40* (2013.01); *B65H 23/0216* (2013.01); *H01M 10/0404* (2013.01); *B65H 2553/42* (2013.01)

(58) Field of Classification Search
CPC ....... B26D 5/007; B26F 1/40; B65H 23/0216; B65H 2553/42; H01M 10/0404
See application file for complete search history.

(56) References Cited

U.S. PATENT DOCUMENTS

| | | | | |
|---|---|---|---|---|
| 6,701,837 | B2 * | 3/2004 | Ohba | ................... B65H 23/038 400/632.1 |
| 10,961,076 | B2 * | 3/2021 | Gordon | ............... B65H 35/008 |

(Continued)

FOREIGN PATENT DOCUMENTS

| | | | |
|---|---|---|---|
| JP | 2000182610 A | * | 6/2000 |
| KR | 10-2013-0105001 A | | 9/2013 |

(Continued)

OTHER PUBLICATIONS

JP_2000182610_A (Year: 200).*

(Continued)

*Primary Examiner* — Jonathan G Riley
(74) *Attorney, Agent, or Firm* — IP & T GROUP LLP

(57) ABSTRACT

An apparatus for manufacturing an electrode plate, includes an unwinder on which an electrode reel is installed; a meandering corrector correcting meandering of an electrode sheet unwound from the electrode reel; a press puncher disposed at a rear end of the meandering corrector; a cutter disposed at a rear end of the press puncher; a detector disposed between the press puncher and the cutter to acquire an image of the electrode sheet; and a controller connected to the detector and the meandering corrector.

12 Claims, 4 Drawing Sheets

(51) Int. Cl.
*B65H 23/02* (2006.01)
*H01M 10/04* (2006.01)

(56) References Cited

U.S. PATENT DOCUMENTS

| 11,926,069 B2 * | 3/2024 | Cho ..................... B65H 23/038 |
| 2002/0007552 A1 * | 1/2002 | Singleton .......... H01M 10/0413 |
| | | 29/730 |

FOREIGN PATENT DOCUMENTS

| KR | 101479724 B1 * | 1/2015 |
| KR | 102192738 B1 * | 12/2020 |
| KR | 10-2219013 B1 | 2/2021 |
| KR | 102257083 B1 * | 5/2021 |
| KR | 102273326 B1 * | 7/2021 |

OTHER PUBLICATIONS

KR_101479724_B1 (Year: 2015).*
KR_102192738_B1 (Year: 2020).*
KR_102257083_B1 (Year: 2021).*
KR_102273326_B1 (Year: 2021).*

* cited by examiner

APPARATUS FOR MANUFACTURING ELECTRODE PLATE

CROSS-REFERENCE TO RELATED APPLICATION(S)

This application is a continuation of U.S. patent application Ser. No. 18/300,879 filed on Apr. 14, 2023, which claims benefit of priority to Korean Patent Application No. 10-2022-0046752 filed on Apr. 15, 2022 in the Korean Intellectual Property Office, the disclosure of which is incorporated herein by reference in its entirety.

BACKGROUND

1. Field

The present disclosure relates to an apparatus for manufacturing an electrode plate.

2. Description of Related Art

In general, a notching facility may be a facility unwinding an electrode reel and using press blanking and cutting to prepare a single electrode sheet. On the other hand, the notching facility may unwind the electrode reel using an unwinder, and may read an interface by a sensor for a line position controller (LPC) to unwind an electrode in a straight line, to prevent meandering.

However, there is a problem that additional meandering occurs due to a long travelling path from the LPC to the press blanking.

In addition, there is a problem that since an inspector detecting the presence or absence of meandering is too far from the LPC, when meandering suddenly occurs, correction of the meandering may be too late.

Korean Patent Publication No. KR 10-2013-105001

SUMMARY

An aspect of the present disclosure may be to provide an apparatus for manufacturing an electrode plate, preventing meandering of an electrode sheet.

According to an aspect of the present disclosure, an apparatus for manufacturing an electrode plate, includes: an unwinder on which an electrode reel is installed; a meandering corrector correcting meandering of an electrode sheet unwound from the electrode reel; a press puncher disposed at a rear end of the meandering corrector; a cutter disposed at a rear end of the press puncher; a detector disposed between the press puncher and the cutter to acquire an image of the electrode sheet; and a controller connected to the detector and the meandering corrector, wherein, as an uncoated portion included in the electrode sheet is removed at a regular interval by the press puncher, a portion of a region coated with an active material is removed, together with the uncoated portion, to protrude the active material toward the uncoated portion of the electrode sheet, and the controller uses a height of the active material protruding toward the uncoated portion of the electrode sheet, in the image acquired from the detector, to determine whether the electrode sheet meanders.

The controller may select at least four regions in the image acquired from the detector, to sense the height of the active material.

The controller may select at least two regions from a region in which the uncoated portion is disposed, and at least two regions from a region in which an end of an electrode coated portion is disposed in the uncoated portion.

The controller may calculate one straight line from the at least two regions selected from the region in which the uncoated portion is disposed, calculate one straight line from the at least two regions selected from the region in which the electrode coated portion is disposed, and then calculate the height of the active material using a vertical distance between the two straight lines.

The controller may determine that the electrode sheet meanders if the height of the active material is less than 0 mm or the height of the active material is greater than 2 mm.

The controller may rotate a pivot table provided in the meandering corrector when the electrode sheet meanders, to correct the meandering of the electrode sheet such that the height of the active material is 1 mm.

The apparatus may further include a first dancer roll disposed at a front end of the meandering corrector, and a second dancer roll disposed between the meandering corrector and the press puncher.

The second dancer roll may be disposed between a first travelling roll disposed at the rear end of the meandering corrector and a second travelling roll disposed at a front end of the press puncher.

The first travelling roll, the second travelling roll, and the second dancer roll may be disposed between the meandering corrector and the press puncher.

The meandering corrector may include a detection sensor detecting an end portion of the electrode sheet.

The meandering corrector may include a pivot table rotating to correct the meandering of the electrode sheet.

The apparatus may further include a vision inspector disposed at a rear end of the cutter.

The controller may drive the meandering corrector to correct the meandering of the electrode sheet using a signal transmitted by a detection sensor provided in the meandering corrector and the vision inspector.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
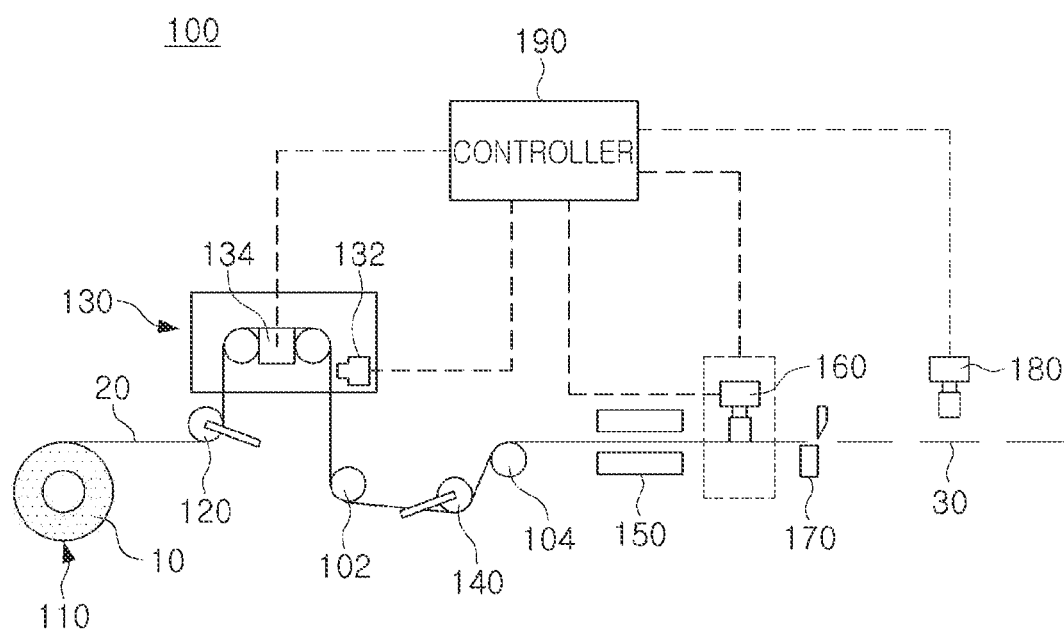
FIG. 1 is a schematic configuration diagram illustrating an apparatus for manufacturing an electrode plate according to an embodiment of the present disclosure.

Hereinafter, preferred embodiments of the present disclosure will be described with reference to the accompanying drawings. Embodiments of the present disclosure may be modified into various different forms, and the scope of the present disclosure is not limited to embodiments described below. In addition, embodiments of the present disclosure may be provided to more fully explain the present disclosure to those with average knowledge in the art. Shapes and sizes of elements in the drawings may be exaggerated for clearer description.

FIG. 1 is a schematic configuration diagram illustrating an apparatus for manufacturing an electrode plate according to an embodiment of the present disclosure.

Referring to FIG. 1, an apparatus 100 for manufacturing an electrode plate according to an embodiment of the present disclosure may be configured to include at least some of an unwinder 110, a first dancer roll 120, a meandering corrector 130, a second dancer roll 140, a press puncher 150, a detector 160, a cutter 170, and a vision inspector 190, for example.

The unwinder 110 may be provided with an electrode reel 10. The electrode reel 10 installed in the unwinder 110 may be wound with an electrode sheet 20, and the electrode sheet 20 unwound from the electrode reel 10 may be manufactured as an electrode plate 30 through the press puncher 150 and the cutter 170.

The first dancer roll 120 may be disposed between the meandering corrector 130 and the unwinder 110, and may be disposed closer to the meandering corrector 130 than the unwinder 110. The first dancer roll 120 may be applied with a certain amount of force in a certain direction by a spring, air pressure, a weight, or the like, such that a constant tension is applied to the electrode sheet 20, regardless of a change in position. Therefore, it is possible to prevent the electrode sheet 20 unwound from the unwinder 110 from being meandering, until the electrode sheet 20 enters the meandering corrector 130.

The meandering corrector 130 may serve to detect a width direction end portion position of the electrode sheet 20, when the electrode sheet 20 is travelled, to adjust a width direction position of the electrode sheet 20. As an example, the meandering corrector 130 may include a line position controller (LPC). The meandering corrector 130 may include a detection sensor 132 detecting the electrode sheet 20, and a pivot table 134 correcting the width direction position of the electrode sheet 20.

Figure 2:
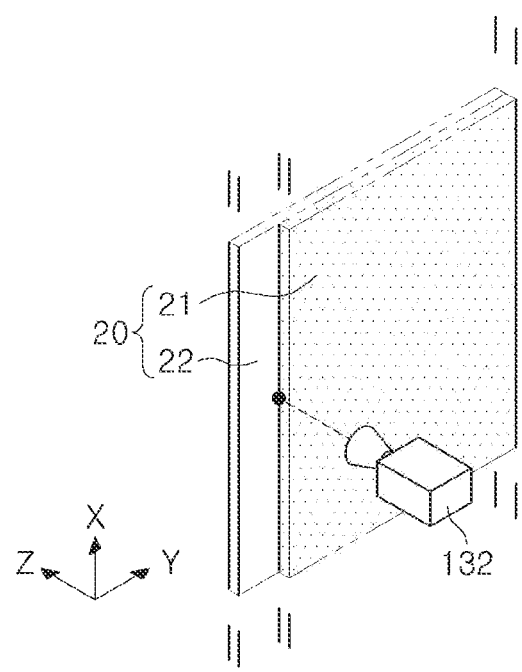
FIG. 2 is a view illustrating a method of detecting an electrode sheet by a detection sensor provided in a meandering corrector of an apparatus for manufacturing an electrode plate according to an embodiment of the present disclosure.

As illustrated in FIG. 2, the detection sensor 132 may detect an end portion line of the electrode sheet 20 to be travelled and moved, such that the controller 190 estimates the width direction position of the electrode sheet 20. For example, the detection sensor 132 may detect an interface between an electrode coated portion 21 on which an active material of the electrode sheet 20 is applied and an electrode uncoated portion 22 on which the active material is not applied. In this case, the width direction means a Y-axis direction of FIG. 2.

The present disclosure is not limited thereto, and the detection sensor 132 may include, for example, a color line sensor. In this case, the detection sensor 132 may detect a change in color or a change in contrast near an end portion of the electrode sheet 20, and may extract a change in the end portion line of the electrode sheet 20, such that the controller 190 estimates a change in width direction end portion position of the electrode sheet 20.

The electrode sheet 20 may be seated and travelled on an upper surface of the pivot table 134, and the pivot table 134 may be rotatably provided. Therefore, when the electrode sheet 20 is travelled with meandering, the pivot table 134 may be rotated to correct the meandering of the electrode sheet 20.

The detection sensor 132 and the pivot table 134 may be connected to the controller 190.

The second dancer roll 140 may be disposed between the meandering corrector 130 and the press puncher 150. For example, the second dancer roll 140 may be disposed between a first travelling roll 102 disposed at a rear end of the meandering corrector 130 and a second travelling roll 104 disposed at a front end of the press puncher 150. The second dancer roll 140 may be also applied with a certain amount of force in a certain direction by a spring, air pressure, a weight, or the like, such that a constant tension is applied to the electrode sheet 20, regardless of a change in position. Therefore, it is possible to prevent the electrode sheet 20 passing through the meandering corrector 130 from being meandering, until the electrode sheet 20 enters the press puncher 150.

Figure 3:
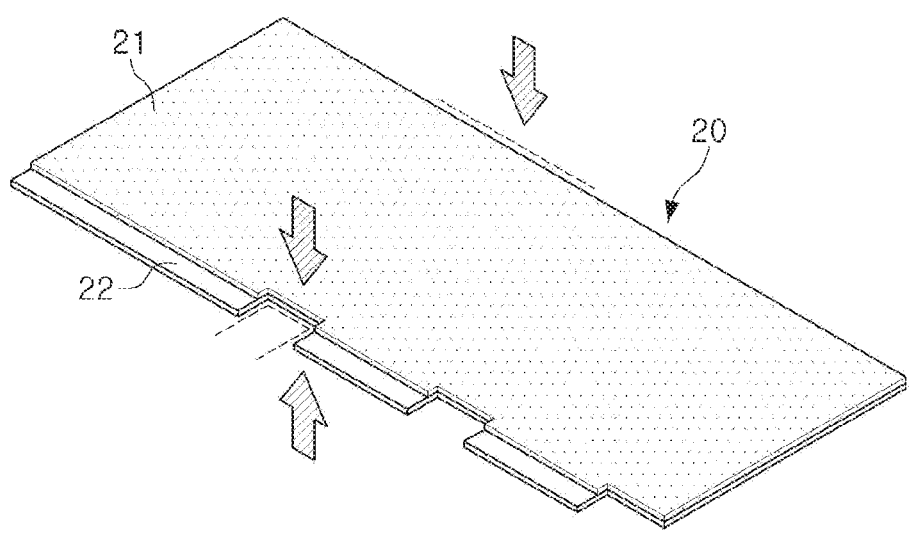
FIG. 3 is a view illustrating a shape of an electrode sheet passing through a press puncher of an apparatus for manufacturing an electrode plate according to an embodiment of the present disclosure.
Figure 4:
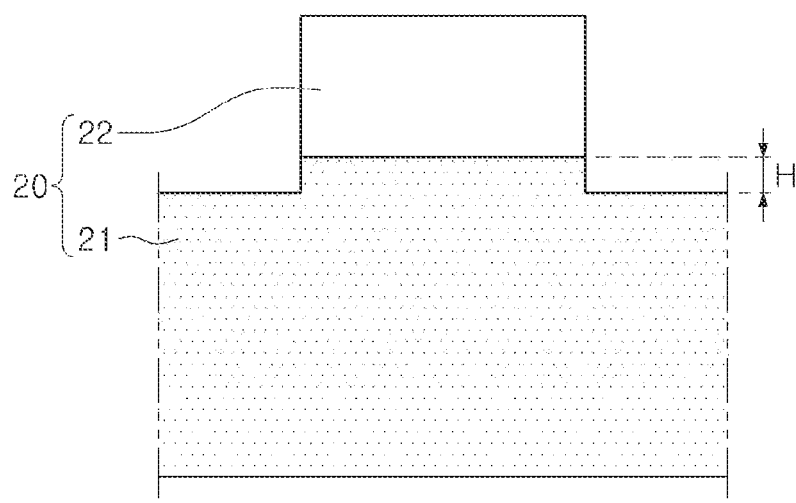
FIG. 4 is a view illustrating detection of a height of an active material by a detector of an apparatus for manufacturing an electrode plate according to an embodiment of the present disclosure.

The press puncher 150 may be disposed at a rear end of the second travelling roll 104, and may remove a portion of an edge of the electrode sheet 20, as illustrated in FIG. 3. For example, while removing the portion of the edge of the electrode sheet 20, the press puncher 150 may remove an edge disposed on a side, opposite thereto. In more detail, as illustrated in FIG. 2, the electrode sheet 20 may include the electrode coated portion 21 coated with the active material and the uncoated portion 22 not coated with the active material. And, as illustrated in FIG. 3, the uncoated portion 22 provided on the electrode sheet 20 may be removed at a regular interval by the press puncher 150. In this case, a region to which the active material is applied, for example, a portion of the electrode coated portion 21 may be removed, together with the uncoated portion 22. Therefore, as illustrated in more detail in FIG. 4, the active material may be disposed to protrude toward the uncoated portion 22 provided on the electrode sheet 20 by a predetermined height H.

When blanking of the electrode sheet 20 is performed by the press puncher 150, the electrode sheet 20 may be pressed by the press puncher 150. As described above, only the first and second travelling rolls 102 and 104 and the second dancer roll 140 may be disposed between the press puncher 150 and the meandering corrector 130, to shorten a travelling distance of the electrode sheet 20 between the press puncher 150 and the meandering corrector 130. Therefore, it is possible to reduce the meandering of the electrode sheet 20 generated between the press puncher 150 and the meandering corrector 130.

In more detail, due to a camber of the electrode sheet 20, degrees of meandering before and after the blanking by the press puncher 150 may be different. For example, before the blanking by the press puncher, a risk of meandering during travelling may increase due to the camber of the electrode sheet 20, and, after the blanking by the press puncher, tension due to the camber of the electrode sheet 20 may be released to reduce the risk of meandering. Therefore, the longer the travelling path ranging from the meandering corrector 130 to the press puncher 150, the higher the risk of additional meandering during travelling.

In the camber in detail, the camber refers to a phenomenon in which a material to which a process such as roll pressing, pressing, or the like is applied causes an elongation difference in a plate width direction, to bend the material on a plane in a left or right direction.

As described above, since only the first and second travelling rolls 102 and 104 and the second dancer roll 140 may be disposed between the meandering corrector 130 and the press puncher 150 to reduce the travelling distance of the electrode sheet 20, the risk of additional meandering during travelling may be reduced. Therefore, it is possible to reduce occurrence of defects.

When the uncoated portion 22 provided in the electrode sheet 20 is removed by the press puncher 150, a region coated with the active material, for example, the electrode coated portion 21 may be removed, together with the uncoated portion 22. Therefore, as illustrated in more detail in FIG. 4, the active material may be disposed to protrude toward the uncoated portion 22 provided on the electrode sheet 20 by a predetermined height H.

The detector 160 may be disposed between the press puncher 150 and the cutter 170. The detector 160 may include a vision sensor, and may detect a height H (see FIG. 4) of the active material protruding toward the uncoated portion 22 provided in the electrode sheet 20. The detector 160 may be also connected to the controller 190, and the controller 190 may determine whether the electrode sheet 20 meanders through information on the height H of the active material detected by the detector 160. In this case, the determination of whether the electrode sheet 20 meanders will be described in more detail.

First, the detector 160 may include the vision sensor, and the controller 190 may select at least four regions as a region-of-image, among images detected by the detector 160 including the vision sensor. In this case, two regions may be selected from the uncoated portion 22, and two regions may be selected from an end region of the electrode coated portion 21 disposed between uncoated portions 22. And, the controller 190 may calculate one straight line in each of the two regions selected from the uncoated portion 22, and may then connect the two straight lines to recognize them as a single straight line. In addition, the controller 190 may calculate one straight line from each of the two regions selected from the end region of the electrode coated portion 21, and may then connect the two straight lines to recognize them as a single straight line. In this manner, the controller 190 may calculate the height H of the active material using the recognized two straight lines.

In this case, in the method of calculating a straight line by the controller 190, the controller 190 may calculate the straight line using a vertical distance between an end of the uncoated portion 22 and a boundary between the uncoated portion 22 and the electrode coated portion 21, in two regions selected from the image detected by the detector 160. Then, straight lines calculated in the two regions may be connected to calculate a straight line defining the boundary between the uncoated portion 22 and the electrode coated portion 21. In addition, the controller 190 may calculate a straight line using a vertical distance between the end of the uncoated portion 22 and an end of the electrode coated portion 21, in the two regions selected from the end region of the electrode coated portion 21. Then, straight lines calculated in the two regions may be connected to calculate a straight line defining the end region of the electrode coated portion 21 disposed between the uncoated portions 22.

In this manner, the height H of the active material may be calculated by the controller 190 using the calculated distance between the two straight lines.

For example, the controller 190 may determine that the electrode sheet 20 does not meander and is normally travelled, if the height H of the active material is within ±1 mm based on 1 mm. Therefore, for example, if the height H of the active material is 0 mm or less and 2 mm or more, the controller 190 may determine that the electrode sheet 20 meanders.

In this case, the controller 190 may start to control the pivot table 134 of the meandering corrector 130, to correct the meandering of the electrode sheet 20. And, when the height H of the active material is 1 mm, the controller 190 may stop an operation of the pivot table 134 of the meandering corrector 130, and may complete the correction of the meandering of the electrode sheet 20.

In this manner, the meandering of the electrode sheet 20 may be detected using the detector 160 including the vision sensor, and may be corrected using the meandering corrector 130, to more accurately determine whether the electrode sheet 20 meanders. And, the correction of the meandering may be performed more precisely.

In this case, referring briefly to a conventional method of detecting whether an electrode sheet 20 meanders, the conventional method may adopt a process of detecting whether the electrode sheet 20 meanders by using an LPC sensor including a laser sensor detecting the boundary between an uncoated portion 22 and an electrode coated portion 21.

For example, the conventional method uses processes in which the uncoated portion 22 and the electrode coated portion 21 are determined by a time difference of laser light received by the LPC sensor after irradiating the laser light, and a boundary between the uncoated portion 22 and the electrode coated portion 21 may be determined by a controller.

The LPC sensor may recognize only a certain inspection region, and for example, a region inspected by the LPC sensor may be an inspection region having a width of approximately 3 to 5 mm. During reel replacement, when a degree of offsetting from between two reels in connecting the two reels is, for example, 10 mm or more, a boundary between the uncoated portion 22 and the electrode coated portion 21 unwound from the connected reels may be disposed outside a region to be inspected by the LPC sensor. In this case, the controller 190 may determine that the electrode sheet 20 meanders even when the electrode sheet 20 does not meander, and may correct the meandering of the electrode sheet 20, to cause occurrence of a defect in the electrode sheet 20 due to an error in detecting whether meandering or not. Such a detection error may also occur due to a manufacturing error in a region in which the electrode coated portion 21 is formed, which occurs when the electrode sheet 20 is manufactured.

In the present disclosure, since the controller 190 determines whether the electrode sheet 20 meanders using the height H of the active material using the image acquired by the detector 160 including a vision sensor, an error in detecting whether meandering or not may be prevented and occurrence of a defect in the electrode sheet 20 due to the error in detecting may be prevented.

In this embodiment, the detector 160 may be disposed between the press puncher 150 and the cutter 170, to detect the meandering of the electrode sheet 20 at a position closer to the meandering corrector 130, and correct the meandering of the electrode sheet 20. Therefore, when a sudden meandering occurs, for example, a connection section between a new electrode reel and an electrode reel of which use is completed is travelled, meandering to be occurred may be detected more quickly, to improve an effect of correcting the meandering.

The cutter 170 may be disposed at a rear end of the press puncher 150, and may cut the electrode sheet 20 into an individual electrode plate 30 at a rear end of the detector 160. Therefore, the electrode sheet 20 may be separated into the electrode plate 30 used in an electrode assembly (not illustrated).

The vision inspector 180 may be disposed at a rear end of the cutter 170, and may inspect appearance of the electrode plate 30 molded as individual electrode plates 30, to detect whether a defect occurs. The vision inspector 180 may be also connected to the controller 190, and the controller 190 may determine whether the electrode plate 30 is defective using an image obtained by the vision inspector 180.

The controller 190 may be connected to the meandering corrector 130, the detector 160, and the vision inspector 180, and may determine whether the electrode sheet 20 meanders and a position of the meandering, using a signal transmitted from the detection sensor 132, the detector 160, and the vision inspector 180. Therefore, the controller 190 may drive the pivot table 134 of the meandering corrector 130, to correct the meandering of the electrode sheet 20.

As described above, since the meandering of the electrode sheet 20 may be corrected using the detection sensor 132 of the meandering corrector 130, the detector 160, and the vision inspector 180, the meandering of the electrode sheet 20 may be corrected by calculating a correction value earlier than the conventional one.

Furthermore, a travelling distance between the meandering corrector 130 and the press puncher 150, which may be a travelling region having a high risk of the meandering of the electrode sheet 20, may be shortened, to further reduce a risk of occurring a defect.

Hereinafter, an operation of an apparatus for manufacturing an electrode plate according to an embodiment of the present disclosure will be described with reference to FIGS. 1 to 4.

An apparatus 100 for manufacturing an electrode plate may prepare a single electrode plate 30 through a meandering corrector 130, a press puncher 150, and a cutter 170 from an electrode reel installed in an unwinder 110.

An electrode sheet 20 unwound from the electrode reel may pass through a first dancer roll 120, and may travel to the meandering corrector 130, and the first dancer roll 120 may reduce meandering of the electrode sheet 20 between the unwinder 110 and the meandering corrector 130.

In addition, in the electrode sheet 20 introduced into the meandering corrector 130, a detection sensor 132 may detect an interface between an electrode coated portion 21 on which an active material of the electrode sheet 20 is applied and an electrode uncoated portion 22 on which the active material is not applied. And, according to a signal from the detection sensor 132, a controller 190 may determine whether the electrode sheet 20 meanders, and may drive a pivot table 134 of the meandering corrector 130, when the electrode sheet 20 meanders, to correct the meandering of the electrode sheet 20.

Thereafter, the electrode sheet 20 may enter the press puncher 150 through a first travelling roll 102, a second dancer roll 140 and a second travelling roll 104. The electrode sheet 20, during traveling, may meander by the second dancer roll 140, and may be suppressed from being travelled. In addition, since only the first travelling roll 102, the second dancer roll 140, and the second travelling roll 104 may be disposed between the meandering corrector 130 and the press puncher 150, a travelling distance of the electrode sheet 20 may be shortened. Therefore, it is possible to suppress meandering occurring in travelling between the meandering corrector 130 and the press puncher 150.

Thereafter, whether meandering occurs in the electrode sheet 20 in which blanking is performed by the press puncher 150 may be detected by a detector 160, before reaching the cutter 170. The detector 160 may be disposed between the press puncher 150 and the cutter 170. The detector 160 may include a vision sensor, and may detect a height H (see FIG. 4) of the active material protruding toward the uncoated portion 22 provided in the electrode sheet 20, using an image acquired through the detector 160.

In this regard, first of all, the detector 160 may include the vision sensor, and may select at least four regions as a region-of-image, among images detected by the detector 160 including the vision sensor. In this case, two regions may be selected from the uncoated portion 22, and two regions may be selected from an end region of the electrode coated portion 21 disposed between uncoated portions 22. And, the controller 190 may calculate one straight line in each of the two regions selected from the uncoated portion 22, and may then connect the two straight lines to recognize them as a single straight line. In addition, the controller 190 may calculate one straight line from each of the two regions selected from the end region of the electrode coated portion 21, and may then connect the two straight lines to recognize them as a single straight line. In this manner, the controller 190 may calculate the height H of the active material using the recognized two straight lines.

In this case, in the method of calculating a straight line by the controller 190, the controller 190 may calculate the straight line using a vertical distance between an end of the uncoated portion 22 and a boundary between the uncoated portion 22 and the electrode coated portion 21, in two regions selected from the image detected by the detector 160. Then, straight lines calculated in the two regions may be connected to calculate a straight line defining the boundary between the uncoated portion 22 and the electrode coated portion 21. In addition, the controller 190 may calculate a straight line using a vertical distance between the end of the uncoated portion 22 and an end of the electrode coated portion 21, in the two regions selected from the end region of the electrode coated portion 21. Then, straight lines calculated in the two regions may be connected to calculate a straight line defining the end region of the electrode coated portion 21 disposed between the uncoated portions 22.

In this manner, the height H of the active material may be calculated by the controller 190 using the calculated distance between the two straight lines.

For example, the controller 190 may determine that the electrode sheet 20 does not meander and is normally travelled, if the height H of the active material is within ±1 mm based on 1 mm. Therefore, for example, if the height H of the active material is 0 mm or less and 2 mm or more, the controller 190 may determine that the electrode sheet 20 meanders.

In this case, the controller 190 may start to control the pivot table 134 of the meandering corrector 130, to correct the meandering of the electrode sheet 20. And, when the height H of the active material is 1 mm, the controller 190 may stop an operation of the pivot table 134 of the meandering corrector 130, and may complete the correction of the meandering of the electrode sheet 20.

In this manner, the meandering of the electrode sheet 20 may be detected using the detector 160 including the vision sensor, and may be corrected using the meandering corrector 130, to more accurately determine whether the electrode sheet 20 meanders. And, the correction of the meandering may be performed more precisely.

Thereafter, the electrode sheet 20 may be manufactured into a single sheet of electrode plate 30 while passing through the cutter 170.

As described above, since the meandering of the electrode sheet 20 may be corrected using the detection sensor 132 of the meandering corrector 130, the detector 160, and the vision inspector 180, the meandering of the electrode sheet 20 may be corrected by calculating a correction value earlier than the conventional one.

Furthermore, a travelling distance between the meandering corrector 130 and the press puncher 150, which may be a travelling region having a high risk of the meandering of the electrode sheet 20, may be shortened, to further reduce a risk of occurring a defect.

The present disclosure has an effect of preventing the electrode sheet from meandering.

While example embodiments have been illustrated and described above, it will be apparent to those skilled in the art that modifications and variations could be made without departing from the scope of the present disclosure as defined by the appended claims.

What is claimed is:

1. An apparatus for manufacturing an electrode plate, comprising:
    an unwinder on which an electrode reel is installed;
    a meandering corrector correcting meandering of an electrode sheet unwound from the electrode reel;
    a press puncher disposed at a rear end of the meandering corrector;
    a cutter disposed at a rear end of the press puncher;
    an image detector configured to acquire an image of the electrode sheet, and the image detector disposed between the press puncher and the cutter;
    a controller connected to the image detector and the meandering corrector, and
    a first dancer roll disposed at a front end of the meandering corrector, and a second dancer roll disposed between the meandering corrector and the press puncher,
    wherein the electrode reel comprises the electrode sheet,
    wherein, as an uncoated portion included in the electrode sheet is removed at a regular interval by the press puncher, a portion of a region coated with an active material is removed, together with the uncoated portion, and wherein the active material protrudes toward the uncoated portion of the electrode sheet, and
    wherein the controller is configured to use a height of the active material protruding toward the uncoated portion of the electrode sheet, in the image acquired from the image detector, to determine whether the electrode sheet meanders.

2. The apparatus of claim 1, wherein the controller is configured to select at least four regions in the image acquired from the image detector to sense the height of the active material.

3. The apparatus of claim 2, wherein the controller is configured to select at least two first sub-regions from an uncoated region in which the uncoated portion is disposed, and at least two second sub-regions from a coated region in which an end of an electrode coated portion is disposed between adjacent first sub-regions.

4. The apparatus of claim 3, wherein the controller is configured to calculate a first straight line from the at least two first sub-regions selected from the uncoated region, and configured to calculate a second straight line from the at least two second sub-regions selected from the coated region, and then configured to calculate the height of the active material using a vertical distance between the first and second straight lines.

5. The apparatus of claim 4, wherein the controller is configured to determine that the electrode sheet meanders if the height of the active material is 0 mm or less or the height of the active material is 2 mm or more.

6. The apparatus of claim 1,
    wherein the meandering corrector includes a pivot table,
    wherein the controller is configured to rotate the pivot table provided in the meandering corrector when the electrode sheet meanders for correcting the meandering of the electrode sheet.

7. The apparatus of claim 1, wherein the second dancer roll is disposed between a first travelling roll disposed at the rear end of the meandering corrector and a second travelling roll disposed at a front end of the press puncher.

8. The apparatus of claim 7, wherein the first travelling roll, the second travelling roll, and the second dancer roll are disposed between the meandering corrector and the press puncher.

9. The apparatus of claim 1, wherein the meandering corrector comprises a detection sensor detecting an end portion of the electrode sheet.

10. The apparatus of claim 9, wherein the meandering corrector comprises a pivot table rotating to correct the meandering of the electrode sheet.

11. The apparatus of claim 1, further comprising a vision inspector comprising an imager, and configured to inspect appearance of the electrode plate to detect whether a defect occurs, and the vision inspector disposed at a rear end of the cutter.

12. The apparatus of claim 11, wherein the controller is configured to drive the meandering corrector to correct the meandering of the electrode sheet using a signal transmitted by a detection sensor provided in the meandering corrector and the vision inspector.

* * * * *